United States Patent [19]

Ishikawa

[11] Patent Number: 4,843,898
[45] Date of Patent: Jul. 4, 1989

[54] WIPER LINKAGE OF CROSS ARM TYPE

[75] Inventor: Masaru Ishikawa, Yokohama, Japan

[73] Assignee: Jidosha Denki Kogyo Kabushiki Kaisha, Japan

[21] Appl. No.: 168,772

[22] Filed: Mar. 16, 1988

[30] Foreign Application Priority Data

Mar. 17, 1987 [JP] Japan ................... 62-60099

[51] Int. Cl.$^4$ .................. F16H 21/52; F16C 11/06; B60S 1/24
[52] U.S. Cl. .................... 74/51; 15/250.31; 15/250.34; 403/71
[58] Field of Search ............... 74/42, 51; 15/250.27, 15/250.31, 250.34; 403/71

[56] References Cited

U.S. PATENT DOCUMENTS

| | | | |
|---|---|---|---|
| 3,853,414 | 12/1974 | Hirano et al. | 403/71 |
| 3,861,812 | 1/1975 | Ito | 403/71 |
| 4,009,502 | 3/1977 | Tamaki et al. | 15/250.27 |
| 4,552,480 | 11/1985 | McIntyre | 403/71 X |
| 4,701,064 | 10/1987 | Mizusawa | 403/71 |

FOREIGN PATENT DOCUMENTS 2114623 10/1972 Fed. Rep. of Germany ... 15/250.31

Primary Examiner—Allan D. Herrmann
Attorney, Agent, or Firm—Sughrue, Mion, Zinn, Macpeak and Seas

[57] ABSTRACT

A wiper linkage of the cross arm type is provided with a driving rod, an oscillation arm, two cross arms interlinking the driving rod and the oscillation arm, and restrictive alignment-free couplings connecting the cross arms between the driving rod and oscillation arm. In this linkage, it is possible to connect the coupling parts easily and to absorb dimensional errors in the coupling parts, and to also make the coupling waterproof by a sealing member. Furthermore, a smooth and noiseless action of the linkage can be obtained.

2 Claims, 6 Drawing Sheets

WIPER LINKAGE OF CROSS ARM TYPE

BACKGROUND OF THE INVENTION

1. Field Of The Invention

This invention relates to a wiping device which wipes a windshield of an automobile or the like to remove raindrops, dust and the like on it, and in particular to a wiper linkage of the cross arm type which is used with a mechanism of the single-arm type wiper having a single wiper blade.

2. Description of the Prior Art

Heretofore, there has been used a wiper linkage of the cross arm type which is known under the name of Tschebyscheff's cross link device.

Namely, the wiper linkage of the cross arm type described above is shown in FIGS. 5 to 9.

In the figures, a driving rod is indicated with numeral 100, numeral 101 designates an idler having an idle arm 101a, numerals 102 and 103 designate cross arms and numeral 104 designates a lever having a pivot shaft 105.

Said cross arms 102 and 103 are provided with coupling bases 102a, 102b, 103a and 103b made of synthetic resin and located at opposite ends thereof as shown in FIG. 7.

In the coupling of said cross arm 102 with said driving rod 100, a coupling pin 107 is put through the coupling base 102b and an interposed wave washer 106, and flattened firmly against the driving rod 100 as shown in FIG. 8 and FIG. 9.

Also in the coupling of the cross arm 103 with the driving rod 100, the coupling pin 107 is flattened firmly against the driving rod 100 through the wave washer 106 in the same manner as said cross arm 102.

In the coupling of the cross arms 102 and 103 with the lever 104, coupling pins 107 and 107 are put through coupling bases 102a and 103a and interposed wave washers 106 and 106, and flattened firmly against both ends of the lever 104.

Namely, at both ends of the lever 104 having the pivot shaft 105, each of cross arms 102 and 103 is connected by plane linking. The cross arms 102 and 103 are also connected by plane linking in the coupling with driving rod 100. The driving rod 100 is connected by plane linking to the idler 101 in the same manner as described above.

Therefore, the dimensional error in the couplings between the lever 104 and the cross arms 102, 103 or the cross arms 102, 103 and the driving rod 100 is absorbed by the wave washers 106.

However, in the conventional wiper linkage of the cross arm type as described above, it is very complicated to assemble because the couplings of the lever 104 with the cross arms 102 and 103 or the cross arms 102 and 103 with the driving rod 100 are connected by plane linking by flattening the ends of the coupling pins 107 firmly. There is a problem since there is a limit in the maximum allowable error due to the dimensions of the wave washer 106 because the dimensional error absorption at said coupling part connected by plane linking is obtained by the wave washer 106.

Considering the waterproof property of the respective coupling parts, it is necessary to waterproof at the upper and lower sides of respective coupling bases 102a, 102b, 103a and 103b shown in FIG. 7 and therefore it is a problem since such a waterproof structure becomes very complicated.

SUMMARY OF THE INVENTION

The present invention solves the aforementioned problems of the prior art and as a result of particular considerations of the structure provides a wiper linkage of the cross arm type which is easy to connect by means of the respective coupling parts and is easily made into a waterproof structure.

The construction of the wiper linkage of the cross arm type according to this invention for attaining the above-mentioned object is characterized by having a driving rod connected with a motor arm at one end of the driving rod and movable on a substantially straight line, an oscillation arm provided with a pivot shaft, two cross arms interlinking two points on said oscillation arm and two points on said driving rod in non-aligned crossed relation, the first cross arm of said two cross arms interlinking one end of said oscillation arm and another end of said driving rod, the second cross arm of said two cross arms interlinking another end of said oscillation arm and a point spaced some distance from said another end of the driving rod, and at least two couplings each comprising a ball pin provided with a cylindrical contacting projection, an elastic joint member provided with a contacting part engaged with said contacting projection on an inner periphery thereof, and a sealing member to exclude water and the like if necessary.

DESCRIPTION OF THE PREFERRED EMBODIMENT

An embodiment of the wiper linkage of the cross arm type according to this invention will be described below on basis of FIGS. 1 to 4.

Figure 1:
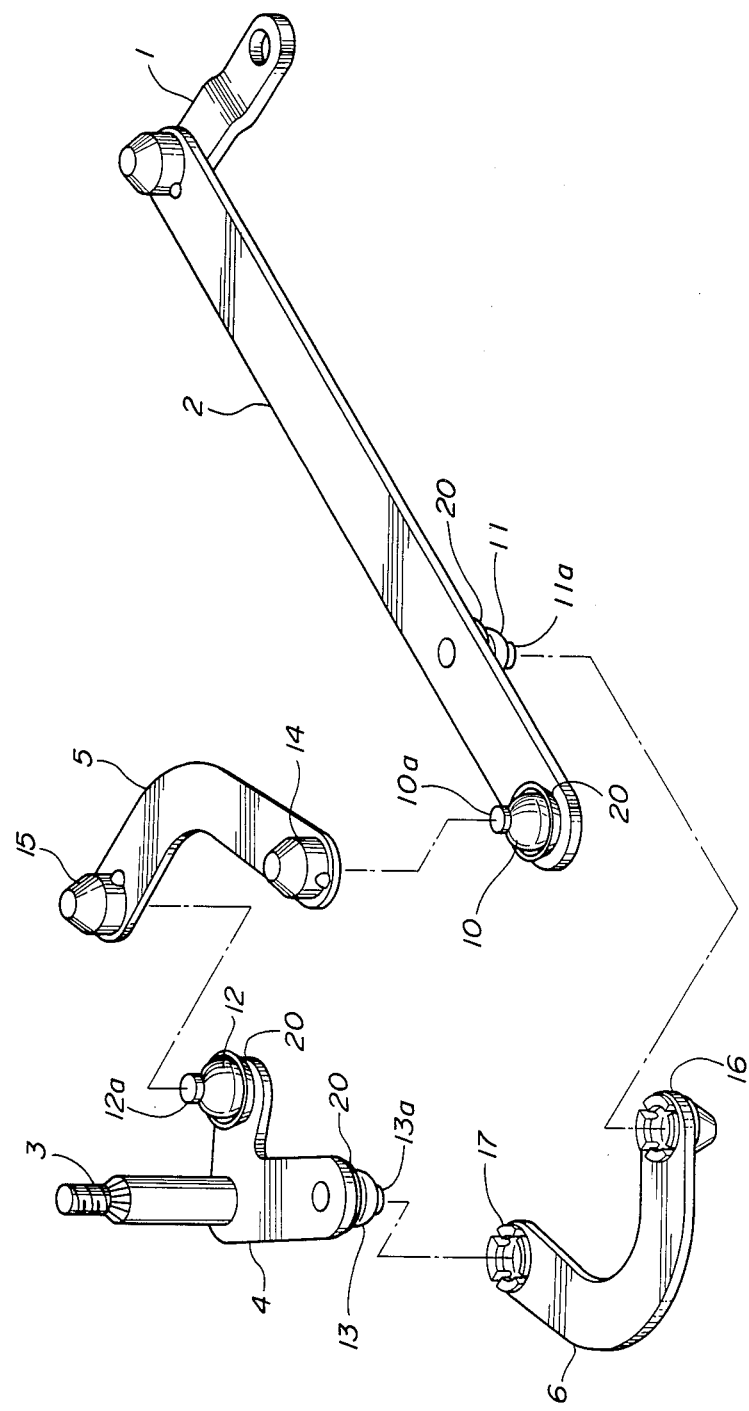
FIG. 1 is an exploded perspective view illustrating the assembling relations of individual parts of the wiper linkage of the cross arm type according to an embodiment of the invention.
Figure 2:
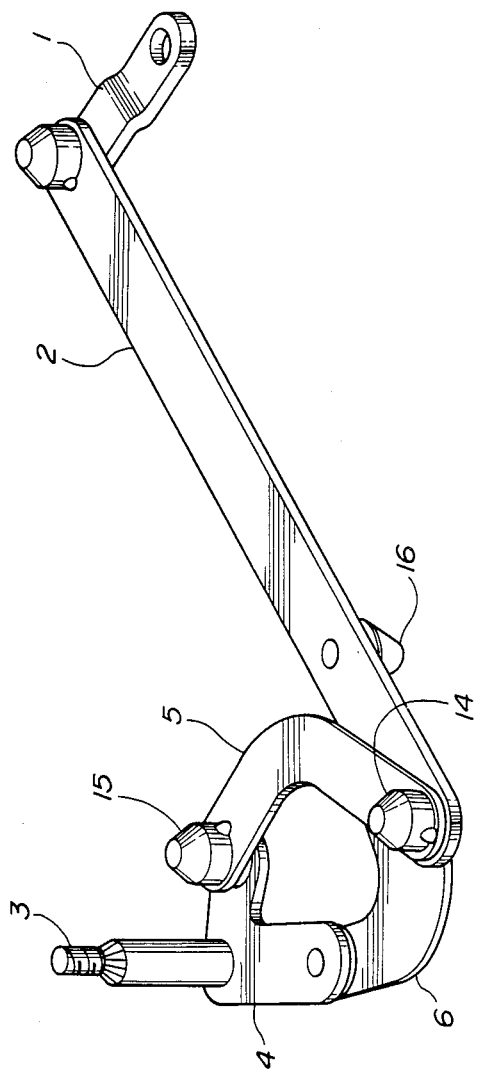
FIG. 2 is a perspective view in the assembled state of the wiper linkage of the cross arm type shown in FIG. 1.

Namely, as shown in FIG. 1, the wiper linkage of the cross arm type according to this invention is provided with a driving rod 2 connected with a motor arm 1 at one end of the driving rod 2 and movable in a substantially straight line, an oscillation arm 4 equipped with a pivot shaft 3 connected with a wiper arm having a wiper blade (not shown), a first cross arm 5 interlinking one end of said oscillation arm 4 and the other end of said driving rod 2, and a second cross arm 6 interlinking another end of said oscillation arm 4 and a point spaced some distance from the other end of the driving rod 2. In this embodiment, a coupling connects one end of said oscillation arm 4 with said first cross arm 5, a coupling connects another end of said oscillation arm 4 with said second cross arm 6, a coupling connects the other end of said driving rod 2 with said first cross arm 5, and a coupling connects said driving rod 2 with said second cross arm 6 at a point spaced some distance from the other end of said driving rod 2. The various parts are free from alignment in a restricted range as described later.

The rotary motion of the motor arm 1 is converted into substantially straight line motion of the driving rod 2 and is converted into an oscillating motion of the oscillation arm 4 on the pivot shaft 3 through the first cross arm 5 and the second cross arm 6 connected with the driving rod 2.

The driving rod 2 is rotatably connected with one end of the motor arm 1 at one end thereof as shown on the right-hand side in FIG. 1, and is provided with a ball pin 10 having a contacting projection 10a secured on the upper surface of the other end thereof as shown on the left-hand side in FIG. 1. The driving rod 2 is provided with a ball pin 11 having a contacting projection 11a on the reverse face at a point spaced some distance from the other end thereof as shown in FIG. 1.

Furthermore, said ball pin 10 and ball pin 11 ar provided with water sealing members 20, 20 respectively.

The oscillation arm 4 having the pivot shaft 3 is provided with ball pins 12 and 13 having contacting projections 12a and 13a at both ends in a position opposing each other on the upper and lower sides thereof. The ball pin 12 and ball pin 13 are provided with water sealing members 20, 20 respectively.

The first cross arm 5 is provided with a resinous joint member 14 forming a part of an alignment-free coupling connected with the ball pin 10 on the driving rod 2. The joint member 14 can be rotatably connected with the ball pin 10 attached to the end of driving rod 2 by means of complementary spherical parts. The first cross arm 5 is provided with a resinous joint member 15 forming a part of an alignment-free coupling at the end connected with the oscillation arm 4. The joint member 15 can be rotatably connected with the ball pin 12 attached to the end of oscillation arm 4 by means of complementary spherical parts.

Moreover, the second cross arm 6 is provided with a resinous joint member 16 forming a part of an alignment-free coupling at one end connected with the driving rod 2. The joint member 16 can be rotatably connected with the ball pin 11 attached to the driving rod 2 by means of complementary spherical parts. The second cross arm 6 is provided with a resinous joint member 17 forming a part of an alignment-free coupling at another end connected with the oscillation arm 4. The joint member 17 can be rotatably connected with the ball pin 13 attached to an end of oscillation arm 4 by means of complementary spherical parts.

Figure 3:
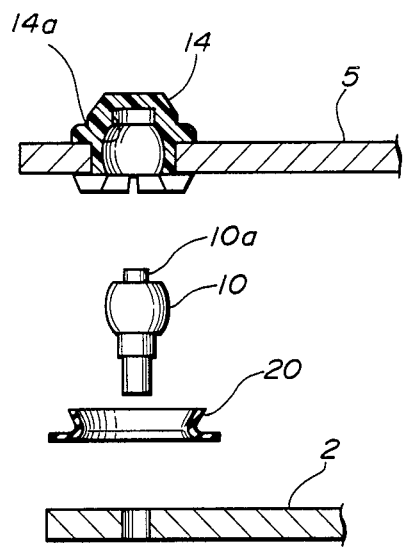
FIG. 3 is a vertical exploded, partial sectional view of respective parts illustrating the coupling parts of the first cross arm with the driving rod in the wiper linkage of the cross arm type shown in FIG. 1.
Figure 4:
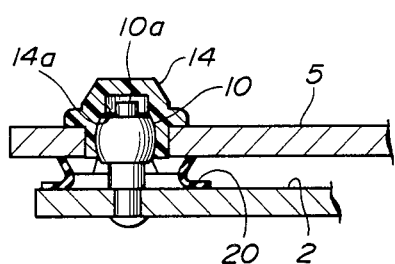
FIG. 4 is a vertical partial sectional view illustrating the assembled state of the first cross arm with the driving rod shown in FIG. 3.
Figure 5:
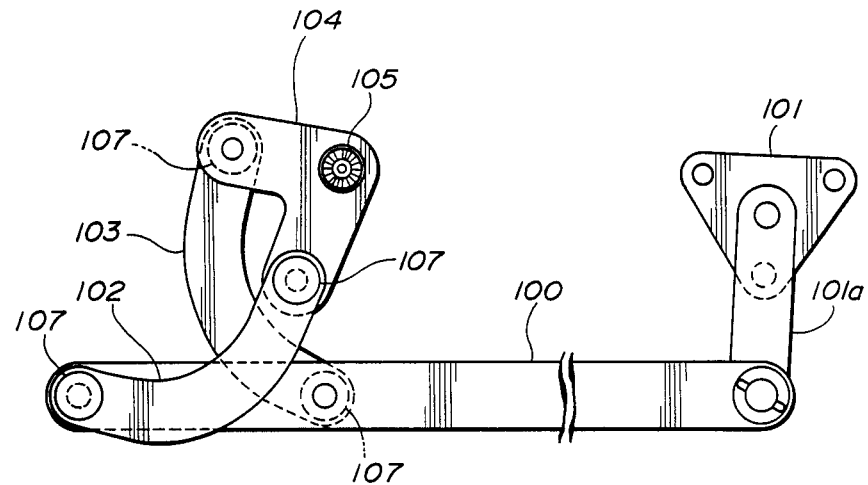
FIGS. 5 and 6 are plan views illustrating a conventional wiper linkage of the cross arm type in two positions, respectively.
Figure 6:
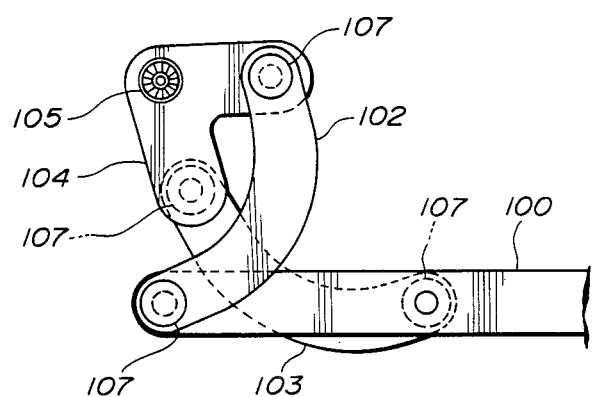
Figure 7:
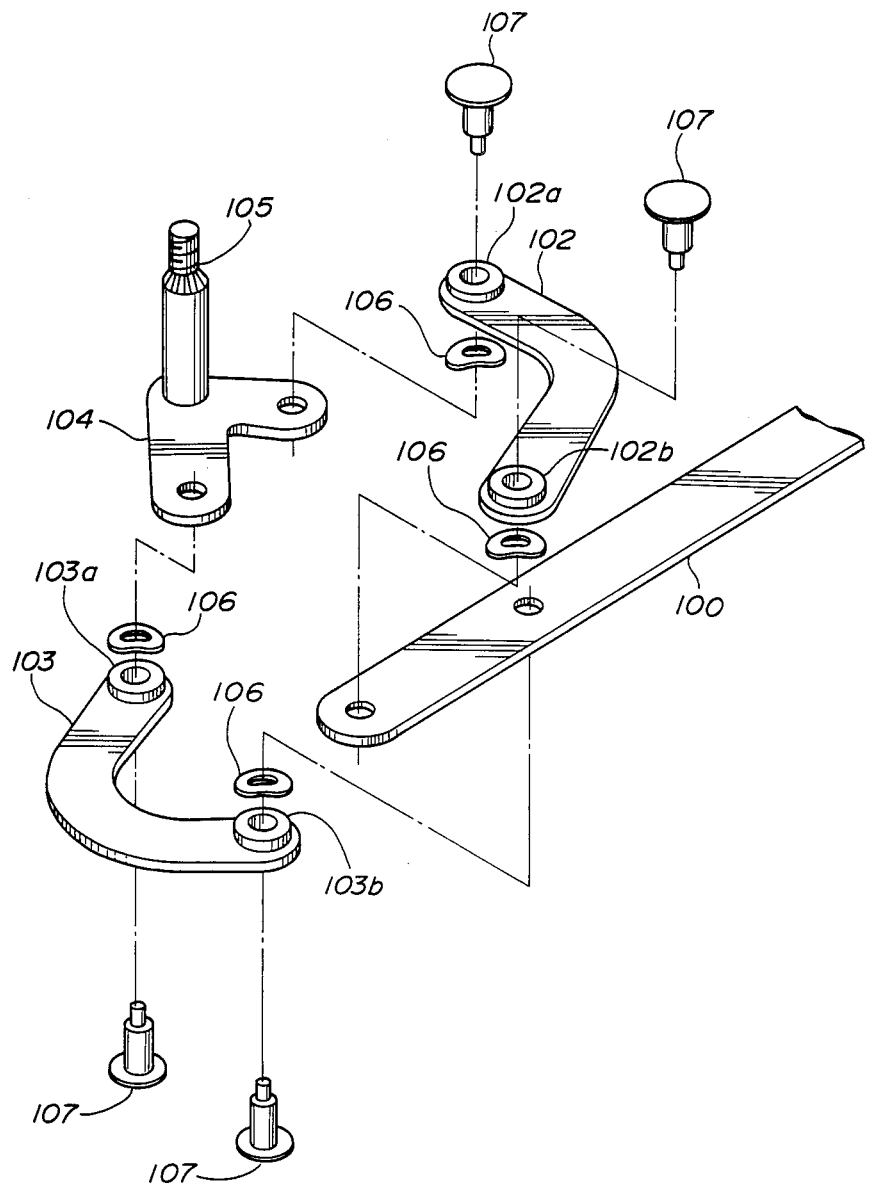
FIG. 7 is a perspective exploded view of the respective parts illustrating the assembling relations of individual parts of the conventional wiper linkage of the cross arm type.
Figure 8:
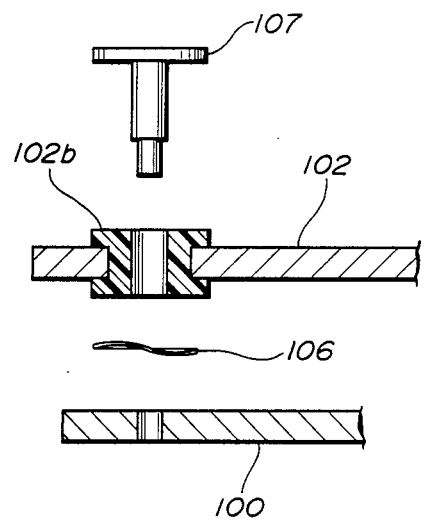
FIG. 8 is a vertical, exploded partial sectional view of the respective parts illustrating the coupling parts of the cross arm with the driving rod in the conventional wiper linkage of the cross arm type.
Figure 9:
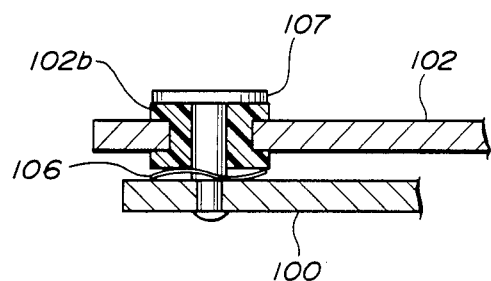
FIG. 9 is a vertical partial sectional view illustrating the assembled state of the cross arm with the driving rod in the conventional wiper linkage of the cross arm type.

In FIG. 3 and FIG. 4, the structure of the couplings parts of the first cross arm 5 with the driving rod 2 is shown as an example. The ball pin 10 attached to the driving rod 2 is inserted in the joint member 14 attached to the first cross arm 5 and define complementary spherical parts which connect the first cross arm 5 to the driving rod 2 from alignment within a range determined by the contacting projection 10a equipped on said ball pin 10 which contacts a contacting part or recess 14a in the internal surface of the joint member 14. The water sealing member 20 is attached in full contact with the first cross arm 5 and driving rod 2 respectively to prevent water and the like from entering into the coupling parts.

The respective couplings of the joint member 15 attached to the first cross arm 5 with the ball pin 12 attached to the oscillation arm 4, the ball pin 13 attached to the oscillation arm 4 with the joint member 17 attached to the second cross arm 6, and the joint member 16 attached to the second cross arm 6 with the ball pin 11 attached to the driving rod 2 connect in the same manner as the coupling parts shown in FIG. 3 and FIG. 4.

In such a manner, the rotary motion of the motor arm 1 connected with a wiper motor (not shown) is converted into substantially straight line motion of the driving rod 2. Since said driving rod 2 and said oscillation arm 4 are interlinked through the first cross arm 5 and the second cross arm 6 in alignment-free relation in the range restricted by said contacting projections of the ball pins and said contact parts of the joint member, a dimensionally allowable limit is defined by these connections, and the substantially straight line motion of the driving rod 2 is converted onto oscillating motion of the oscillation arm 4 on the pivot shaft 3, and the wiper arm having a wiper blade (not shown) connected to pivot shaft 3 is moved.

Moreover, the waterproof property to be required for respective coupling parts can be obtained relatively easily with water sealing members 20 attached to ball pins 10, 11, 12 and 13.

In this embodiment of the wiper linkage of the cross arm type according to this invention, both ends of the first cross arm 5 and both ends of the second cross arm 6 are connected with the driving rod 2 and the oscillation arm 4 by alignment-free couplings, respectively, as shown in the figures.

As mentioned above, the wiper linkage of the cross arm type according to this invention has a driving rod connected with the motor arm at one end of the driving rod, an oscillation arm provided with a pivot shaft, two cross arms interlinking two points on said oscillation arm and at least two couplings comprising a ball pin provided with a cylindrical contacting projection, an elastic joint member provided with a contacting part engaging with said contacting projection in the inner periphery thereof, and the sealing members if necessary, whereby the oscillation arm and the driving rod are connected through said cross arms in alignment free relation in a restricted range on at least one side of said oscillation arm and said driving rod. Therefore, the connecting of respective coupling parts can be performed by easily and certainly by "one-touch-handling". Excellent effects are obtained since it is possible to move within the dimensionally allowable limits of respective coupling parts and to transmit the power very smoothly without noise.

I claim:

1. A wiper linkage of the cross arm type comprising:

a driving rod member connected with a motor arm member at one end thereof and movable on a substantially straight line;

an oscillation arm member provided with a pivot shaft adapted to have a wiper connected thereto;

two cross arm members interlinking two points on said oscillation arm member and two points on said driving rod member in crossed relation to each other, a first cross arm member of said two cross arm members interlinking one end of said oscillation arm member and another end of said driving rod member and a second cross arm member of said two cross arm members interlinking another end of said oscillation arm member and a point spaced a substantial distance from said another end of said driving rod member; and coupling means interconnecting said members comprising a ball pin connected to one of said members and provided with a cylindrical contacting projection and an elastic socket joint connected to another of said members and provided with a contacting part receiving said contacting projection therein for engagement with an inner periphery thereof whereby said members are connected in an alignment free manner.

2. A wiper linkage of the cross arm type as set forth in claim 1, wherein said coupling means further includes a sealing member surrounding a portion of said ball pin between said members to exclude water and the like.

* * * * *